US009973547B1

(12) United States Patent
Simms

(10) Patent No.: US 9,973,547 B1
(45) Date of Patent: May 15, 2018

(54) METHOD AND SYSTEMS FOR ADAPTIVELY MANAGING HYPERTEXT TRANSFER PROTOCOL SESSIONS IN A CONTENT DELIVERY NETWORK

(71) Applicant: Concurrent Computer Organization, Duluth, GA (US)

(72) Inventor: Aaron Simms, Buford, GA (US)

(73) Assignee: Vecima Networks Inc., British Columbia (CA)

( * ) Notice: Subject to any disclaimer, the term of this patent is extended or adjusted under 35 U.S.C. 154(b) by 151 days.

(21) Appl. No.: 15/019,726

(22) Filed: Feb. 9, 2016

(51) Int. Cl.
*G06F 15/16* (2006.01)
*H04L 29/06* (2006.01)
*H04L 12/801* (2013.01)
*H04L 29/08* (2006.01)

(52) U.S. Cl.
CPC .......... *H04L 65/1069* (2013.01); *H04L 47/10* (2013.01); *H04L 63/0236* (2013.01); *H04L 63/08* (2013.01); *H04L 63/10* (2013.01); *H04L 67/02* (2013.01)

(58) Field of Classification Search
CPC . H04L 65/1069; H04L 47/10; H04L 63/0236; H04L 63/08; H04L 63/10; H04L 67/02
See application file for complete search history.

(56) References Cited

U.S. PATENT DOCUMENTS

| | | | |
|---|---|---|---|
| 8,213,408 B1* | 7/2012 | Thomas | H04L 63/0823 370/252 |
| 8,341,255 B2 | 12/2012 | Gopalakrishnan | |
| 8,752,157 B2* | 6/2014 | Radhakrishnan | G06F 21/335 726/1 |
| 8,826,332 B2* | 9/2014 | Marshall | H04N 21/23430 725/119 |
| 8,918,535 B2 | 12/2014 | Ma et al. | |
| 8,924,998 B2* | 12/2014 | Matuchniak | H04N 7/162 725/25 |
| 9,210,154 B2* | 12/2015 | Okamoto | H04L 63/08 |
| 9,332,287 B2* | 5/2016 | Matuchniak | H04N 7/162 |
| 9,501,212 B2* | 11/2016 | Marshall | H04L 21/23430 |
| 9,537,659 B2* | 1/2017 | Yin | H04L 9/3236 |
| 2004/0133914 A1* | 7/2004 | Smith | H04N 7/17318 725/86 |
| 2010/0299552 A1* | 11/2010 | Schlack | H04L 47/10 714/4.1 |

(Continued)

*Primary Examiner* — Moustafa M Meky
(74) *Attorney, Agent, or Firm* — Philip H. Burrus, IV

(57) ABSTRACT

A system (100) includes an interface portal (116) to receive (401), at a resource locator (402) pointing to media content (101), a request (117) for the media content from a client device (109). A server complex (102) can validate a secure token (403) of the request, and can issue a new token (405) that includes one or more session identification credentials (406). These can include a session identifier (407) indicating a session required to retrieve the media content to the client device, an identifier of an edge server (105) to serve the request for the media content, and other information. A resource management system (106), operable with the server complex and the edge server, can then throttle a data rate of the session as a function of the one or more session identification credentials or terminate the session as a function of the one or more session credentials.

20 Claims, 6 Drawing Sheets

(56) References Cited

U.S. PATENT DOCUMENTS

| | | | |
|---|---|---|---|
| 2011/0047566 A1* | 2/2011 | Matuchniak | H04N 7/162 |
| | | | 725/29 |
| 2012/0184258 A1 | 7/2012 | Kovvali et al. | |
| 2013/0227078 A1 | 8/2013 | Wei et al. | |
| 2013/0254343 A1 | 9/2013 | Stevens et al. | |
| 2013/0275602 A1* | 10/2013 | Havekes | H04L 41/0893 |
| | | | 709/226 |
| 2015/0067185 A1 | 3/2015 | Tamblin et al. | |
| 2015/0089077 A1 | 3/2015 | Acharya et al. | |
| 2015/0128165 A1* | 5/2015 | Matuchniak | H04N 7/162 |
| | | | 725/25 |

\* cited by examiner

METHOD AND SYSTEMS FOR ADAPTIVELY MANAGING HYPERTEXT TRANSFER PROTOCOL SESSIONS IN A CONTENT DELIVERY NETWORK

BACKGROUND

Technical Field

This disclosure relates generally to content delivery systems, and more particularly to methods and systems for managing content delivery systems.

Background Art

Content delivery systems deliver content to subscriber devices. This delivery generally occurs in real time, i.e., when the content is being received by a content delivery system, or "on demand" at a later time. Using a media content delivery system as an example, in an on-demand application a consumer can choose not only the content they wish to see, but also the viewing time as well. When a person orders a video-on-demand session, the selected content is delivered from a server to a receiving unit at the person's location, which is frequently a set-top box.

Traditional content delivery systems operated with a central server or hub of the system operating as an application service provider. However, as content delivery networks have evolved, many content delivery networks now offer other options for client devices to access media content. For example, many content delivery networks have offered streaming services supported by the Real Time Streaming Protocol (RTSP). Recently, content delivery networks are allowing client devices to access content via Hypertext Transfer Protocol (HTTP) requests as well.

The introduction of HTTP content delivery in content delivery networks is not without issues. In many content delivery systems, the content service provider has little control over client HTTP requests. While there is some ability to throttle bandwidth, a service provider has little oversight into the actual requests being made or the ability to terminate client requests. While such controls exist for RTSP content delivery, there is no counterpart for HTTP content delivery due to content delivery network architecture. This is largely due to the fact that HTTP content delivery utilizes web server technologies where the web server or web servers are treated as independent entities without an overarching control system overseeing and managing their activities. Said differently, client management and access in HTTP content delivery is typically handled via server settings, rather than through the business rules or via the system management devices operating in content delivery networks.

It would be advantageous to have an improved methods and systems for monitoring, controlling, and even terminating HTTP content delivery in content delivery network architectures.

Figure 1:
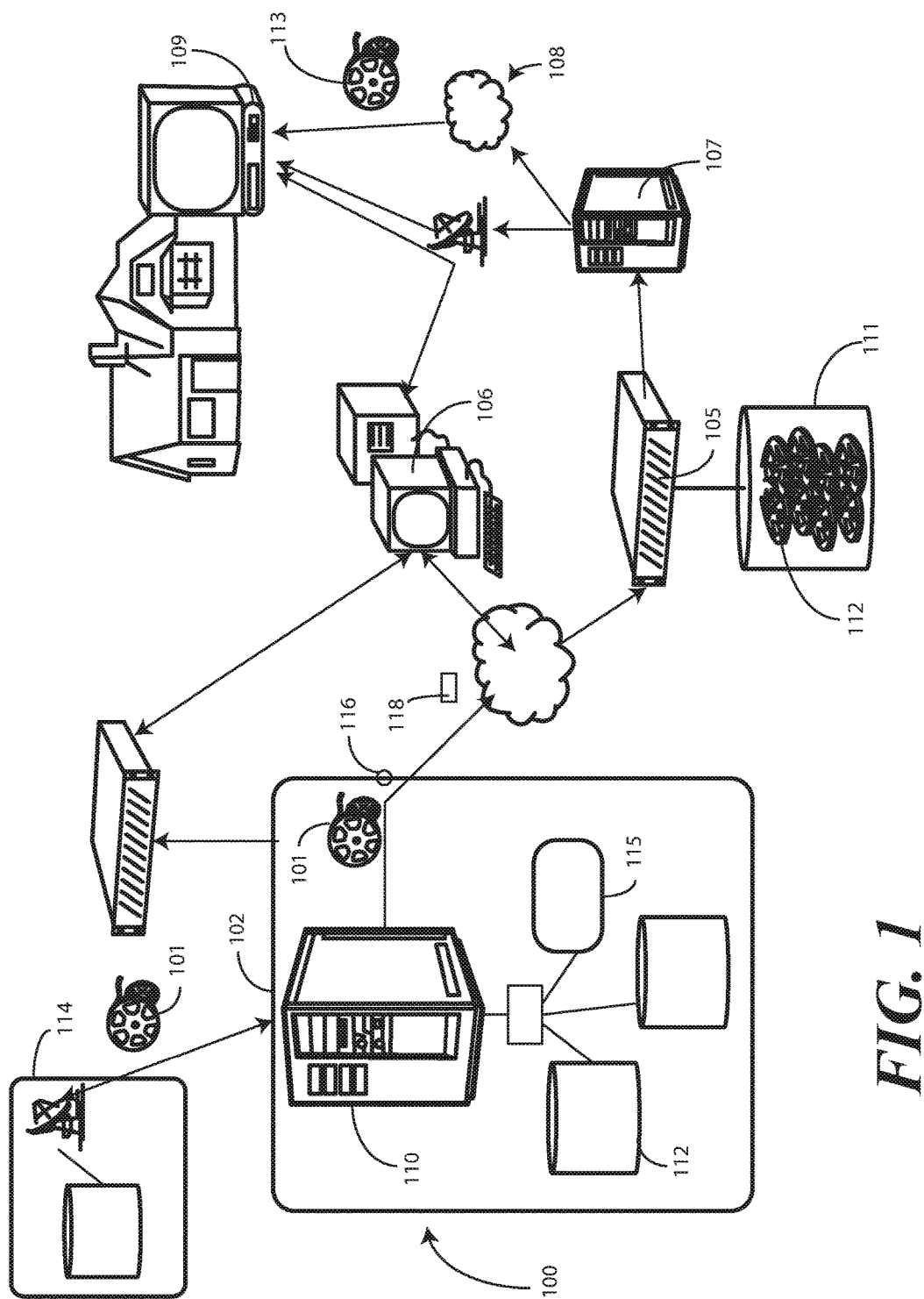
FIG. 1 illustrates one explanatory content delivery system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to control of HTTP sessions in content delivery networks, allowing the operator of the content delivery network to manage, report on, and limit client access to the content delivery network via business rules and system management devices operating in the content delivery network. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of allowing the operator of the content delivery network to manage, report on, and limit client access to the content delivery network via business rules and system management devices operating in the content delivery network as described herein. The non-processor circuits may include, but are not limited to, a network communication receiver, a network communication transmitter, signal drivers, clock circuits, power source circuits, and user input devices. As such, these functions may be interpreted as steps of a method to perform allowing the operator of the content delivery network to manage, report on, and limit client access to the content delivery network via business rules and system management devices operating in content delivery networks. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to content delivery networks, improve the functioning of the system by allowing content delivery network operators to manage, report on, and limit client access to the content delivery network via business rules and system management devices operating in the content delivery network, and improving the overall user experience to overcome problems specifically arising in the realm of the technology associated with excessive bandwidth usage occurring with some HTTP content delivery.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide, at a server complex, a method of redirecting content requests requesting content from a generic resource locator to a device specific resource locator with which the content, formatted as necessary for a requesting device, can be retrieved. In one embodiment, a server complex includes an interface portal to receive requests for media content from a number of client devices. In one embodiment, some client devices need content formatted in one manner, while other client devices need content formatted in another manner. For instance, a first client device may be configured to receive the media content in a first format while a second client device is configured to receive the media content in a second format. Examples of different formats include different video formats, different encoding methods, different packaging containers, different adaptive bitrates, and different resolutions. In other unique embodiments, a first format may include commercials, while a second format does not. Still other format differences will be obvious to those of ordinary skill in the art having the benefit of this disclosure.

As noted above, content service provider operating content delivery networks have little control over client HTTP requests. While there is some ability to throttle bandwidth, a service provider has little oversight into the actual requests being made or the ability to terminate client requests. This is largely due to the fact that the web server technologies used in HTTP services treat various serves as independent actors without an "overarching" control system that oversees and manages activities between the actors. Accordingly, client management and access occurs in accordance with server settings, rather than the business rules governing content delivery network operation as set forth by a central management system.

Advantageously, embodiments of the disclosure provide a content delivery network system that facilitates a global control of HTTP sessions occurring in the content delivery network. Embodiments of the disclosure allow an operator of a content delivery system to manage, report on, and limit client access to the CDN via business rules and operations natively occurring in the content delivery network.

For example, embodiments of the disclosure provide validation of an initial client request for HTTP content hosted and/or served by the content delivery network. Additionally, embodiments of the disclosure provide for the inclusion of a secure token having one or more session identification credentials. The secure token is then used by the client device to obtain the content from an edge server. Using the session identification credentials of the secure token, a system operator in a content delivery network can validate HTTP requests for content, such as by verifying that the request is coming from a client with a currently valid session. The system operator can then use the session identification credentials to block specific clients from using HTTP to access content, terminate on-going sessions, such as when bandwidth exceeds a predetermined threshold or criterion, and throttle sessions when bandwidth usage exceeds a predetermined threshold or criterion. Moreover, a system provider can use the session identification credentials for reporting purposes, including the reporting of current sessions and utilized bandwidth.

In one embodiment, a content delivery network includes a resource management system that tracks active HTTP sessions. The tracking occurs due to the fact that, in one embodiment, a request router delivers a notification message that an HTTP session has begun, along with one or more session identification credentials. These session identification credentials can include a client Internet Protocol (IP) address, a client device type, the name of the content being requested, the time the content is being requested, the type of session, and, in one embodiment, a secret key. In one or more embodiments, each of these session identification credentials is pulled from a secure token used in an HTTP GET request from a client device. An optional redirection step from central servers to edge servers can be used for popular content. The serving server, be it the edge server or a central server, can also deliver session information to the resource management system, including start and end time of the session, duration, and cache hits and misses. In one or more embodiments, from these session identification credentials taken from the secure token, the resource management system can kill active sessions or throttle sessions. The resource management system can further block specific clients or generate reports on those using excessive bandwidth.

In one embodiment, a content delivery system includes an interface portal to receive, at a resource locator pointing to media content, a request for the media content from one client device of a plurality of client devices. In one or more embodiments, the request comprises an HTTP GET request. In one or more embodiments, to enable validation of the request, the request includes a secure token.

The content delivery network then includes a server complex comprising one or more processors operable with the interface portal. In one embodiment, the one or more processors of the server complex can be operable to validate the secure token. In one embodiment, upon validating the secure token, the one or more processors can issue a new token comprising one or more session identification credentials.

In one embodiment, the one or more session identification credentials comprise a session identifier indicating a session required to retrieve the media content to the client device. In one embodiment, the session identification credentials further include an identifier of an edge server, operable with the server complex, to serve the request for the media content. The session identification credentials can include other information as well, including one or more of an IP address of the requesting client device, a client device user agent, i.e., identifier of device type, a name of the content requested, a request time, a type of session, e.g., Adaptive Bit Rate (ABR) or HTTP, etc., and in one embodiment, a secret key shared between the request router and the edge server serving the content to the requesting device. Other examples of session identification credentials will be obvious to those of ordinary skill in the art having the benefit of this disclosure.

In one embodiment, the one or more processors of the server complex then redirect the client device to another resource locator pointing to the media content at the edge server. A resource management system, operable with the server complex and the edge server, then receives session information from the edge server as a function of the session identification credentials. From this information, the resource management system can one or more of throttle a data rate of the session as a function of the one or more session identification credentials or terminate the session as a function of the one or more session credentials.

Advantageously, embodiments of the disclosure provide a token-based data throttling system based upon session identification credentials included in a token issued by the server complex. In contrast to session-based throttling of prior art systems, embodiments of the disclosure provide a token-based system suitable for use with legacy content delivery network system components. Advantageously, using embodiments of the disclosure, operators of content delivery networks can rate limit HTTP content delivery sessions a function of the session identification credentials included in the token.

Turning now to FIG. 1, illustrated therein is one embodiment of a system 100 configured in accordance with one or more embodiments of the disclosure. The system 100 of FIG. 1 is a content delivery network configured for delivering media content 101 to one or more client devices, e.g., client device 109. FIG. 1 illustrates a macro-level view of the system 100, while more detailed structures will be described in more detail later. The system 100 of FIG. 1 is suitable for implementing the methods for allowing the operator of the content delivery network to manage, report on, and limit client access to the content delivery network via business rules and system management devices operating in the content delivery network as described herein.

The illustrative system 100 of FIG. 1 includes a server complex 102 that is operable with a back office system 103 and a resource management system 106. In one embodiment, the server complex 102 includes an interface portal 116. The interface portal 116 is configured to receive requests 117 for media content 101 from a client device 109.

The server complex 102 can include one or more servers. In FIG. 1, the server complex is shown has having only a central server 110 for brevity. However, one or more intermediate servers can be disposed between the central server 110 and the client devices. The system 100 uses these components to delivery media content 101 to the client devices upon request. Examples of media content 101 include videos, images, website data, movies, television show episodes, movie trailers, and so forth. Other types of media content will be obvious to those of ordinary skill in the art having the benefit of this disclosure.

Figure 3:
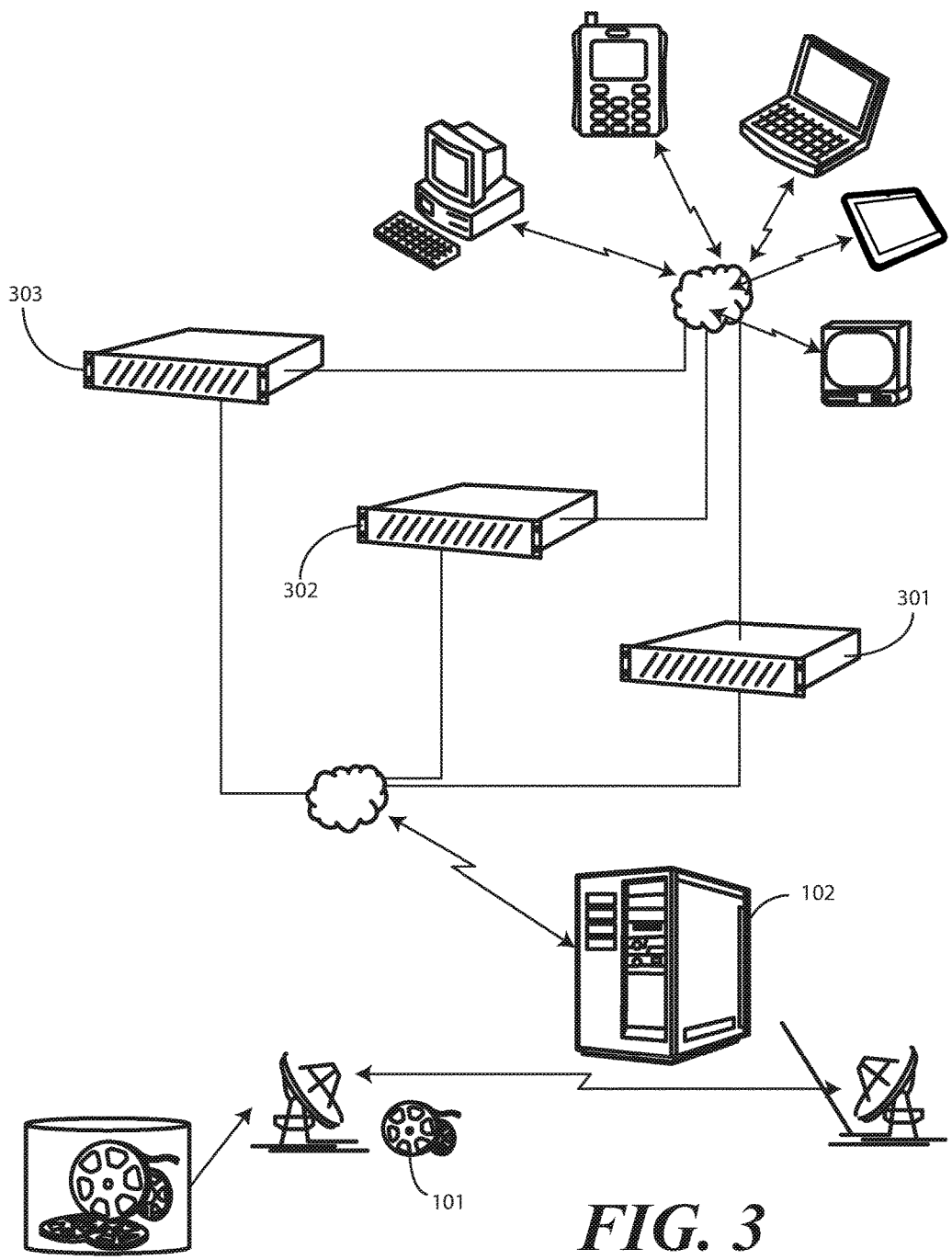
FIG. 3 illustrates another explanatory content delivery system in accordance with one or more embodiments of the disclosure.

The server complex 102 can be operable with one or more edge servers 105 as well. While one edge server 105 is shown in FIG. 1 for brevity, it should be noted that this edge server 105 is representative of multiple edge servers. For example, turning briefly to FIG. 3, the server complex 102 can optionally be operable with one or more edge servers 301,302,303. Accordingly, the server complex 102 can arrange the storage of media content 101 on one or more of the edge servers 301,302,303 for rapid delivery to the client devices by replicating the media content 101 on a memory device of one or more of the edge servers 301,302,303.

Figure 2:
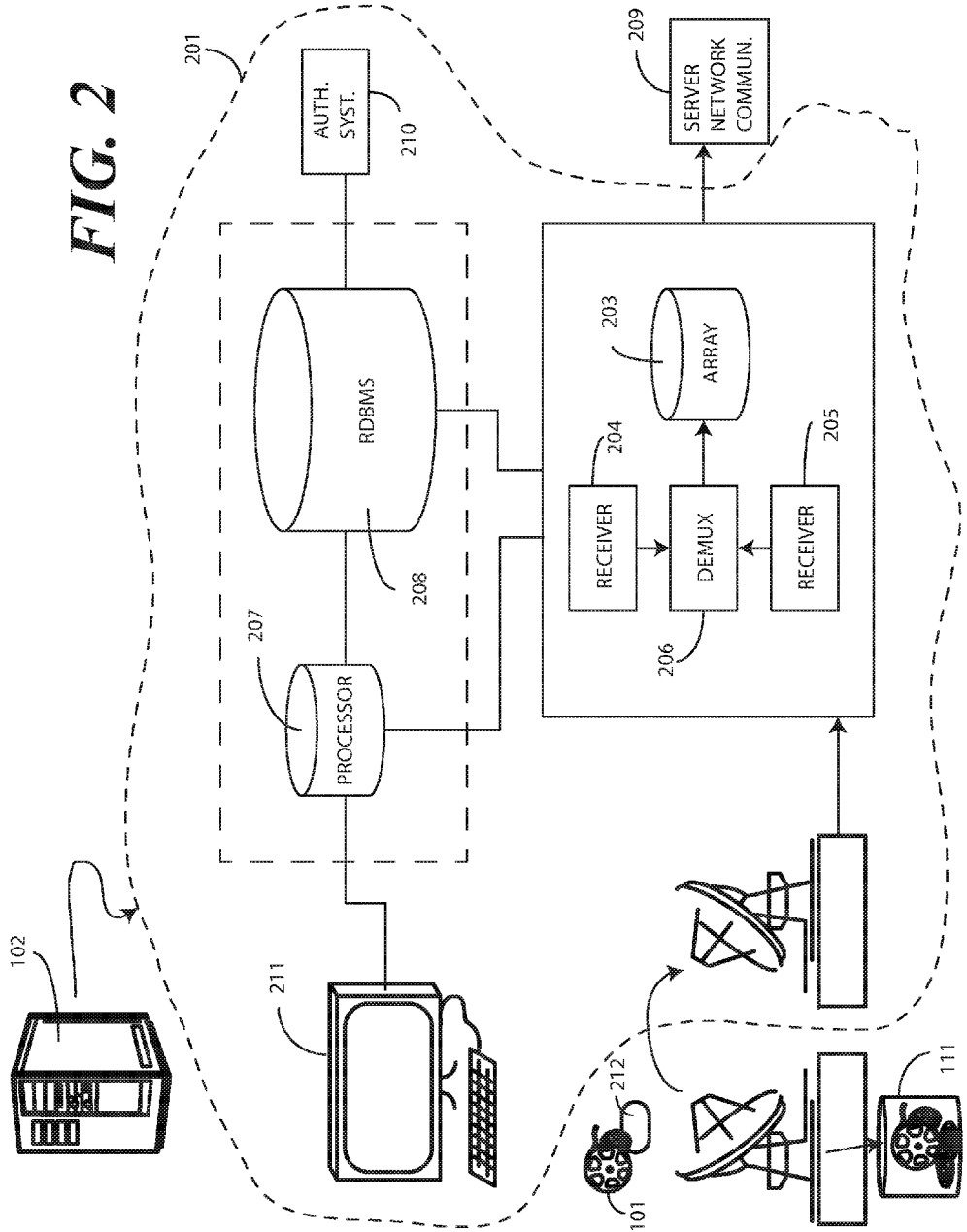
FIG. 2 illustrates one explanatory server complex suitable for use in a content delivery system in accordance with one or more embodiments of the disclosure.

Turning briefly now to FIG. 2, illustrated therein is one explanatory sever complex 102 configured in accordance with one or more embodiments of the disclosure. A schematic block diagram 201 illustrates various components of the server complex 102, showing only those specific details that are pertinent to understanding the embodiments of the present disclosure so as not to obscure the disclosure with details that will be readily apparent to those of ordinary skill in the art having the benefit of the description herein. Accordingly, those of ordinary skill in the art having the benefit of this disclosure will recognize that other components may be included in a server complex 102 as well.

As noted above, in one embodiment the server complex 102 obtains media content 101 from a content provider 114. Regardless of how the media content 101 is received, in one or more embodiments, the server complex 102 stores the media content 101 in a content storage device, such as a disk array 203. Disk array 203 may be a JBOD (just a bunch of disks) or RAID (redundant array of inexpensive disks) with various architectures and interfaces, such as FC-AL (Fiber Channel-Arbitrated Loop) or SSA (Serial Storage Architecture).

The components of the server complex 102 may also include one or more communication devices such as receivers 204,205 for receiving the media content 101. The receivers 204,204 can include DHEI (DigiCable Headend Expansion Interface) receivers or ATM (Asynchronous Transfer Mode) receivers. Demodulating and demultiplexing circuitry 206 may also be included. The server complex 102 can also include communication devices 209 that function as the interface portal (116). For example, the communication devices 209 can receive requests (117) for the media content 101. Additionally, the communication devices 209 can deliver the media content 101 to the various client devices in response to receiving the requests (117) for the media content 101.

In one or more embodiments the server complex 102 includes one or more processors 207 and, optionally, a relational database management system 208. The relational database management system 208 can function, in one or more embodiments, as a server or storage device. The storage devices of the relational database management system 208 can contain a listing or table of one or more of the following: the content providers, the content offerings, manifest files, etc., the servers upon which the content is stored, and so forth. In one or more embodiments, the server complex 102 includes a computer terminal 211 with which an operator can control the operation of the one or more processors 207.

In one or more embodiments, the server complex 102 is coupled with an authorization system 210. The optional authorization system 210 can store information on the features, privileges, benefits, bonuses, space, tiers, etc., available to each content management system and/or to each content provider. The authorization system 210 may be external to the server complex 102 or may be included within the server complex 102, such as part of the relational database management system 208. Thus, when a particular client device (109) requests the media content 101, the server complex 102 may interrogate the authorization system 210 to determine whether or not the client device (109) is authorized to receive the media content 101. If not, then the request may be denied.

Turning now back to FIG. 1, in one or more embodiments, a media content provider 114 makes media content 101 available to the server complex 102. For example, a content receiver (not shown) operable with the server complex 102 can receive the media content 101 from the content provider 114. The media content 101 can include not only the content itself, but also associated data or metadata. Accordingly, the media content 101 can comprise any type of data, metadata, or other content.

The media content provider 114 can provide the media content 101 in various formats. For example, the system may receive radio-frequency signals by satellite or data packets by land-based communication networks. The server complex 102 may also receive data from asynchronous transfer mode (ATM) networks, local feeds, or other sources. Illustrating by example, the media content 101 might comprise digitally compressed video content that is delivered by satellite and that can be demultiplexed and stored in a convenient format such as MPEG, MPEG 2, or MPEG 4. It will be clear to those of ordinary skill in the art having the benefit of this disclosure that other formats can be used as well. Such formats are known in the art and will not be discussed in further detail here in the interest of brevity.

The server complex 102 then manages the storage of the media content 101 across the system 100. For example, the server complex 102 can store the media content 101 in a local repository 112. Where necessary, the server complex 102 can optionally process and/or reformat the media content 101 as necessary for delivery to the client devices. As noted above, the server complex 102 can also be operable with one or more edge servers 105 and edge storage devices 111. Accordingly, the server complex 102 can arrange the storage of media content 101 on the edge storage device 111 by replicating the media content 101 stored in the local repository 122 as replicated content 113 stored in the edge storage device 111.

The edge server 105, in one embodiment, is a device capable of storing quantities of data, including but not limited to the media content 101, video content, and other types of content. In one embodiment, the edge server 105 is operable with a streaming server 107 to deliver media content streams across an interactive network 108 in response to requests from the client device 109. The client device 109 can be a mobile device, smartphone, tablet computer, desktop computer, set-top box, multi-media player, or other type of device configured to specify desired content and/or to receive the video content for consumption by a user. These types of devices are illustrative only, as others will be obvious to those of ordinary skill in the art having the benefit of this disclosure.

In one or more embodiments, a back office system 103 is operable with the server complex 102. The back office system 103, in one embodiment, contains pertinent information required for typical system operation. This information can include subscriber information and identifiers, subscriber device information and identifiers, rules for content delivery across the system 100, and so forth. In some embodiments, the back office system 103 is configured to provide resource management and resource allocation throughout the system 100. In one embodiment, the back office system 103 can be configured to have knowledge of content storage locations across the system 100.

In one or more embodiments, the back office system 103 can be operable top publish resource locators pointing to the media content 101 on the content delivery network. In the case of a wholesale/multi-tenant scenario, each content provider 114 may also have a web portal in which they publish resource locators to media content 101 on the content delivery network.

A resource management system 106 can be operable with the back office system 103 and the server complex 102. In one embodiment, the resource management system 106 is configured to allocate or otherwise manage system resources for the distribution of media content 101 on the side of the system 100 proximately located with the client device 109. For example, the back office system 103 can communicate with the resource management system 106 when video-on-demand sessions commence so that the resource management system 106 can allocate and control the necessary resources. The resource management system 106 can use information from the back office system 103, the edge server 105, the server complex 102, or other system resources to determine resource allocations based upon client device demand or other criteria. For example, as will be described in more detail below, in one embodiment the edge server 105 communicates with the resource management system 106, thereby allowing the resource management system 106 to control resources and/or to determine resource allocation based on measured bandwidth usage, allocation, or limitations.

In one or more embodiments, the resource management system 106 monitors, with the assistance of the edge server 105, ongoing HTTP content delivery sessions. Additionally, the resource management system 106 can perform logging functions and usage data collection, i.e. client access requests served by the content delivery network. In one or more embodiments, the resource management system 106 further maintains accounts, and offers business services, to allow for multi-tenancy and operator wholesale of content delivery network services.

In one or more embodiments, a request router 115 is operable at the server complex 102. In one embodiment, the request router 115 receives incoming client requests 117, which can include HTTP GET requests for media content 101. Where appropriate, in one embodiment the request router 115 is operable to redirect client requests 117 to an appropriate delivery server. For example, if the edge server 105 has stored in its edge storage device 111 the requested media content, the request router 115 can redirect the request 117 from the client device 109 to the edge server. In one or more embodiments, the request router 115 can obtain information from the resource management system 106 for use in making redirection decisions. Additionally, in one or more embodiments the request router 115 handles the validation of external tokens and re-tokenization for the server complex 102. For content delivery network traffic, the server complex 102 can include a Domain Name Server (DNS)

with authority for the domains for the published resource locators of the content delivery network resolves the domains to the IP address of the Request Router.

Figure 4:
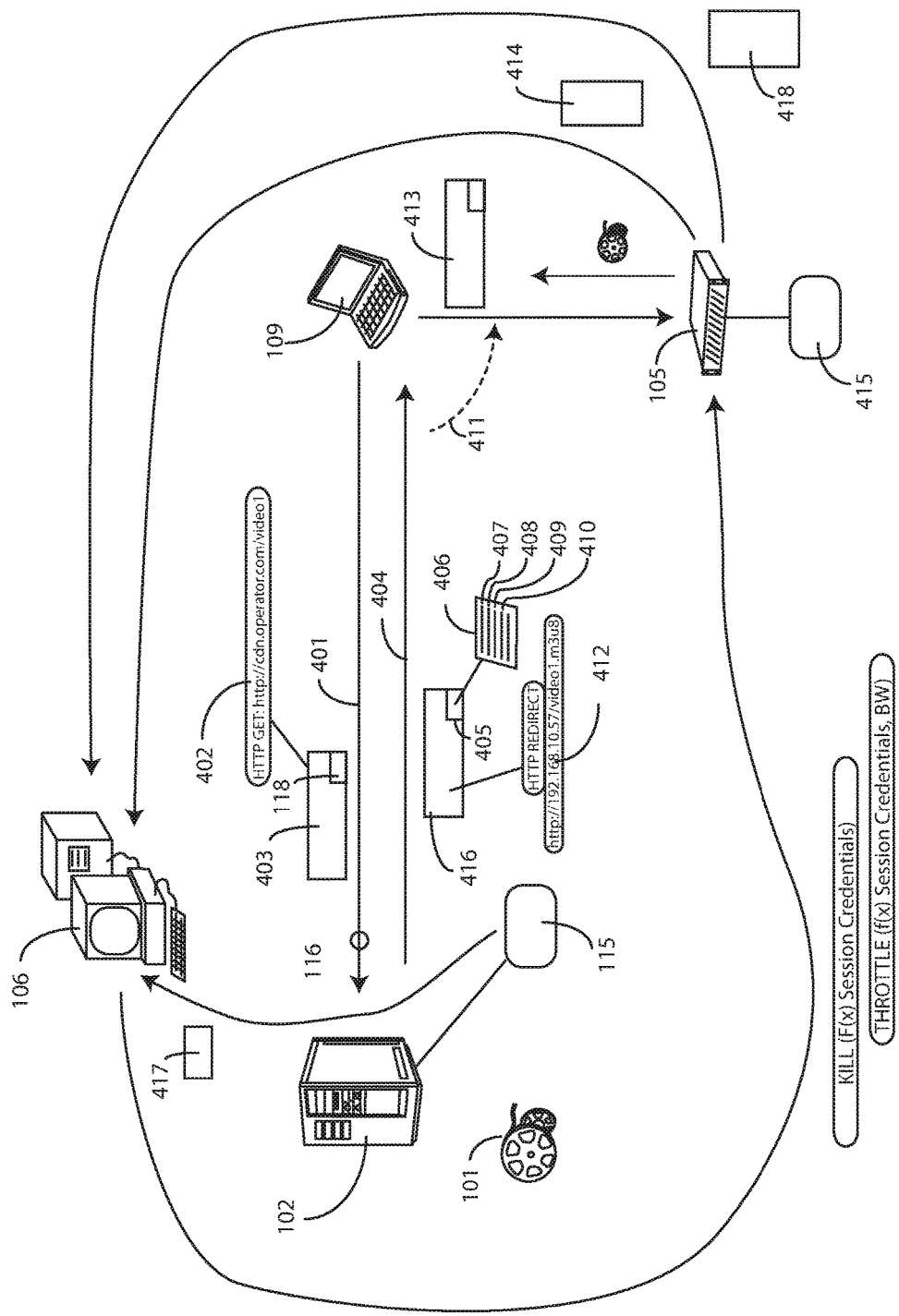
FIG. 4 illustrates one explanatory system in accordance with one or more embodiments of the disclosure.

Turning now to FIG. 4, illustrated therein is the operation of the system 100 of FIG. 1 in accordance with one or more embodiments of the disclosure. FIG. 4 illustrates a portion of the schematic of FIG. 1 with signal flows and communication diagrams to provide a signal diagram of the operation of the system 100 in accordance with one or more embodiments of the disclosure.

As shown in FIG. 4, in one embodiment, the interface portal 116 of the server complex 102 is operable to receive 401, at a resource locator 402 pointing to the media content 101, a request 117 for the media content 101. In one embodiment, the request 117 comprises an HTTP GET request. In one embodiment, the request 117 comprises a secure token 403. In one or more embodiments, the request router 115 of the server complex 102 receives the request 117 at the interface portal 116.

In one embodiment, when the request router 115 of the server complex 102 receives the request 117, one or more processors of the server complex 102, such as those of the request router 115, can then validate the secure token 118 to ensure that the client device 119 is authorized to request media content 101 from the system 100. In one embodiment, the request router 115 also performs geo-blocking checks based upon the IP address of the client device 109.

In one embodiment, upon validating the secure token 118, the server complex 102 can then issue a new token 405 comprising one or more session identification credentials 406. In one embodiment, the one or more session identification credentials comprise a session identifier 407 indicating a session required to retrieve the media content 101 to the client device 109 and an identifier 408 of an edge server 105, operable with the server complex 102, to serve the request 117 for the media content 101. In one embodiment, the session required to retrieve the media content 101 comprises a HTTP session. In one embodiment, the new token 405 further includes a secret key 409 to be shared by the client device 109 and the edge server 105 during the session. The new token 405 can include other information 410, such as an IP address of the client device 109, a client device type, a name of the media content 101, and a timestamp indicating when the media content 101 is requested. These are examples only, as other types of information that can be included with the new token 405 will be obvious to those of ordinary skill in the art having the benefit of this disclosure.

In one or more embodiments, the request router 115 of the server complex 102 is then operable to redirect 411 the request 117 from the client device 109 to another resource locator 412 pointing to the media content 101 at the edge server 105. For example, in one embodiment the request router 115 can provides a new Uniform Resource Locator (URL) to the client device 109 as part of an HTTP redirect message 416. In one embodiment, the request router 115 can also sends a notification message 417 to the resource management system 106 indicating that a new HTTP session will begin on the content delivery network. In one embodiment, the notification message includes the session identification credentials 406 included with the new token 405.

The edge server 105, upon receiving the redirected request 413 can then take several actions. In one embodiment, the edge server 105 sends a notification message 414 to the resource management system 106 that it has received the redirected request 413 associated with a session to deliver the media content 101 to the client device 109. Additionally, the edge server 105 can begin logging client access requests to its HTTP access log, including the session identifier from new tokens received from redirected requests, as part of the log entries.

In one embodiment, at the end of a session, the edge server 104 can log a summary rollup of the session data to a session log file 415. In one embodiment, the session log file 415 is created in W3C log format. Various information can be included in the session log file 415. For example, in one embodiment, the session log file 415 can include the IP address of the client device 109, a user agent field indicating what type of device the client device 109, the resource locator 412 pointing to the media content, the start time of the session, the end time of the session, the duration of the session, and the overall cache hit/miss ratio of the session. The edge server 105 can optionally provide a Simple Network Management Protocol (SNMP) facility to the resource management system 106, thereby allowing the resource management system 106 to poll the edge server 105 for session statistics, such as current active sessions, current bandwidth per session, and aggregate bandwidth utilized.

In one or more embodiments, the edge server 105 may, during the session, receive Application Programming Interface (API) commands from the resource management system 106. As will be described in more detail below, in one or more embodiments the resource management system 106 can one or more of throttle a data rate of the session as a function of the one or more session identification credentials 406, or terminate the session as a function of the one or more session credentials. Accordingly, in one or more embodiments the edge server 105 may receive API commands from the resource management system 106 to kill the session or to throttle the bandwidth of the session by prohibiting the client device 109 from accessing higher bitrates in an Adaptive Bitrate (ABR) manifest file (where the session is an HTTP ABR session), or alternatively from downloading HTTP Progressive Download (PDL) content at a bitrate higher than specified in the throttle command.

The edge server 105 can send, and the resource management system 106 can receive, during the session, log information 418 that includes one or more of bandwidth usage rates for the session or an amount of bandwidth used in the session. Based upon received information, the resource management system 106 can perform several functions. In one or more embodiments, the resource management system 106 can monitor a bandwidth requirement of the session required to retrieve the media content 101 to the client device 109. For example, in one embodiment the resource management system 106 can track information about sessions operating on the system 100, including the total number of sessions, both aggregate and characterized by type, and the total bandwidth of sessions, both aggregate and characterized by type.

In one or more embodiments, where the bandwidth requirement exceeds a predefined bandwidth threshold, the resource management system 106 can take action as a function of the bandwidth usage rates or the amount of bandwidth used during the session. As noted above, in one or more embodiments, the resource management system 106 is operable to one or more of throttle a data rate of the session or terminate the session. In one or more embodiments, these actions occur as a function of the one or more session identification credentials 406 included with the new token 405 to provide token-based bandwidth control throughout the system 100. For example, in one or more embodiments the resource management system 106 is capable of terminating active sessions and throttling active sessions. The resource management system 106 may transmit API commands to the edge server 105 as a function of the session identification credentials 406 as follows:

KillSession(Edge Server IP,Session ID)　　　　　(1)

ThrottleSession(Edge Server IP,Session ID,BW)　　(2)

Command (1) above kills an active session with the denoted session identifier on the indicated edge server 105, while command (2) throttles an active session with the denoted session identifier on the indicated edge server 105 to a bandwidth of BW, in kilo-bits-per-second.

Once the session ends, in one embodiment the edge server 105 sends, and the resource management system 106 receives, the session log file 419. The session log file 419 can be used for future validations of the secure token 403 when requests 117 for media content 101 are received. For example, client devices that have abused bandwidth privileges, as determined by the resource management system 106 from previous session log files, may not be validated.

Figure 5:
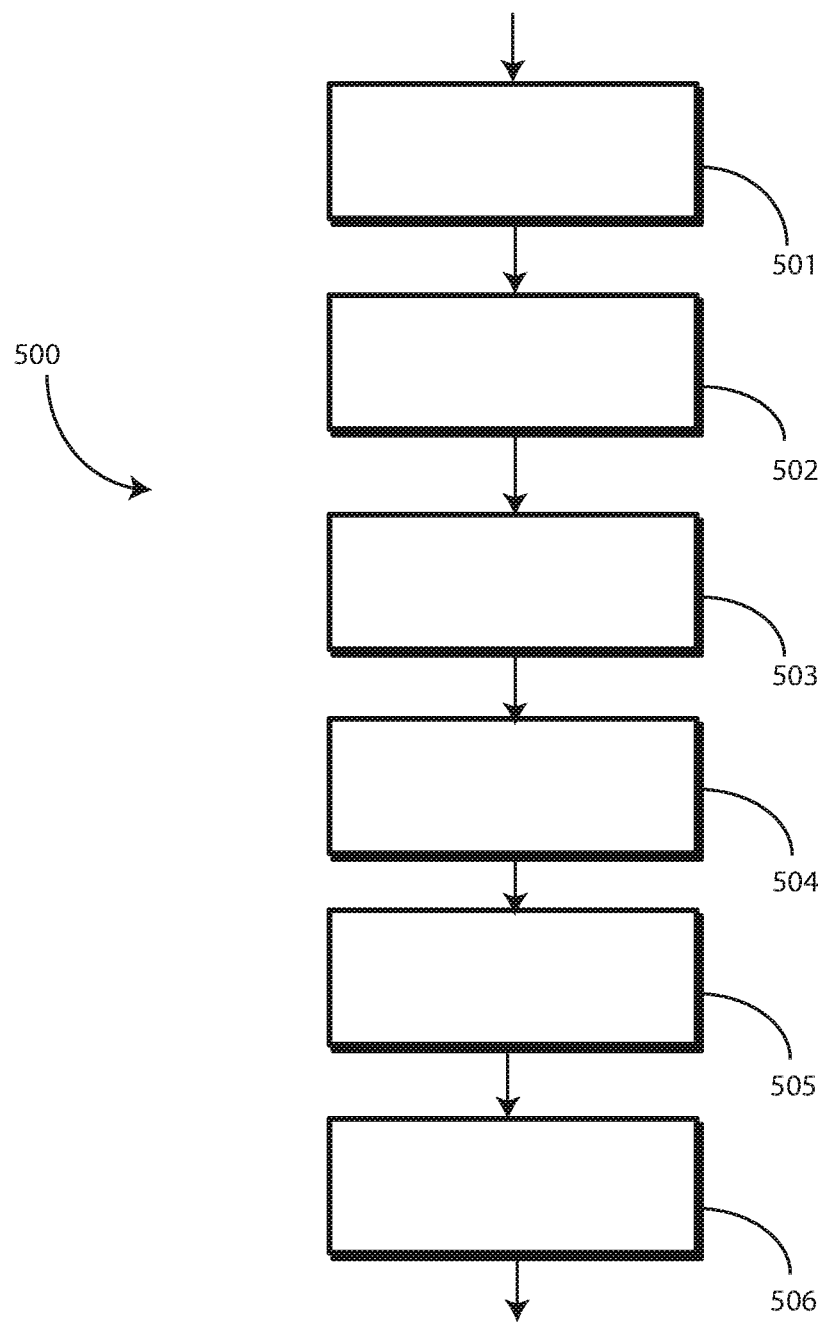
FIG. 5 illustrates one explanatory method in accordance with one or more embodiments of the disclosure.
Figure 6:
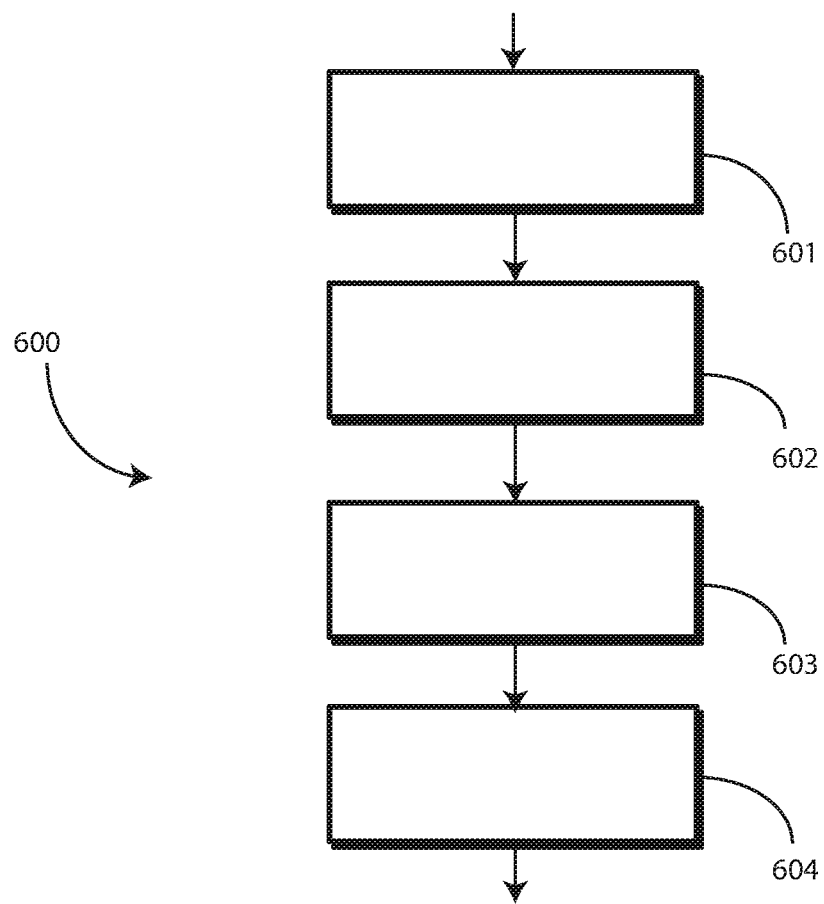
FIG. 6 illustrates another explanatory method in accordance with one or more embodiments of the disclosure.

Turning now to FIGS. 5 and 6, illustrated therein are various method steps that the resource management system (106) can perform to execute the kill and throttle commands to the edge server (105). Beginning with FIG. 5, in one embodiment, at step 501 a method 500 for a content delivery network for controlling HTTP) sessions includes receiving, at an interface portal of a server complex, a request from a client device for media content at a resource locator. In one embodiment, the request received at step 501 comprises a secure token.

At step 502, the method 500 includes validating the secure token. In one embodiment, step 502 is performed with one or more processors of the server complex.

At optional step 503, the method 500 can include identifying an IP address of the client device from the request received at step 501, and blocking the request where the IP address matches one or more predefined criteria. For example, if the client device has exceeded its bandwidth usage limits in prior sessions initiated by prior requests, the method 500 may block the request to prevent subsequent bandwidth abuse.

At step 504, the method 500 includes redirecting the client device to another resource locator at an edge server. In one embodiment, one or more processors of a server complex, optionally configured as a request router, perform the redirection at step 504.

In one embodiment, the redirection of step 504 includes issuing a new token. In one embodiment, the new token comprises session identification credentials such as a session identifier identifying a session required to retrieve the media from the another resource locator to the client device and an edge server identifier of the edge server. As noted above, other information can be included in the session identification credentials as well.

At step 505, in one embodiment the method 500 includes monitoring one or more of bandwidth usage rates for the session or an amount of bandwidth used in the session. In one embodiment, a resource management system performs this step 505.

At step 506, the method includes throttling a data rate of the session as a function of the session identification credentials of the new token. In one embodiment, step 506 is performed with the resource management system that is operable with the one or more processors of the server complex. Optionally, the throttling of step 506 can occur when one or more of bandwidth usage rates monitored at step 505 for the session or the amount of bandwidth used in the session monitored at step 505 exceeds a predetermined bandwidth threshold. At optional step 506, the method 500 can include receiving, from the edge server when the session terminates, a session log file for the session.

Turning now to FIG. 6, illustrated therein is another method 600 for controlling HTTP sessions in a content delivery network. The method 600 of FIG. 6 is similar to the method (500) of FIG. 5. However, rather than throttling, the method 600 of FIG. 6 kills sessions based upon various criteria.

Beginning with step 601, in one embodiment the method 600 receives a request from a client device for media content at a resource locator. In one embodiment, the request received at step 601 comprises a secure token. In one embodiment, the request received at step 601 comprises an HTTP GET request.

At step 602, the method 500 includes validating the secure token. As with the method (500) of FIG. 5, step 602 can optionally include identifying an IP address of the client device from the request received at step 601, and blocking the request where the IP address matches one or more predefined criteria.

At step 603, the method 500 includes redirecting the client device to another resource locator at an edge server. In one embodiment, the redirection of step 603 includes issuing a new token. In one embodiment, the new token comprises session identification credentials such as a session identifier identifying a session required to retrieve the media from the another resource locator to the client device and an edge server identifier of the edge server. As noted above, other information can be included in the session identification credentials as well.

At step 604, in one embodiment the method 600 includes monitoring one or more of bandwidth usage rates for the session or an amount of bandwidth used in the session. At step 605, the method 600 includes terminating the session when the one or more of bandwidth usage rates for the session or the amount of bandwidth used in the session exceeds a predefined threshold. For example, if the session exceeds a maximum bandwidth resource allocation issued to the client device, the session may be terminated.

As shown and described, embodiments of the disclosure advantageously provide HTTP session management in a content delivery network that allows a content delivery network operator to manage, report on, and limit client access to the content delivery network via business rules and system management devices operating in the content delivery network. Components of the system, and corresponding methods, provide for validation of initial client requests for media content hosted and/or served by the content delivery network, inclusion of secure token and session identifier as part of the client's request, and validation of requests for content, such that the content delivery network verifies that the request is coming from a client with a currently valid session. Embodiments of the disclosure also advantageously allow for the operator to block specific clients, terminate on-going HTTP sessions, and to throttle bandwidth usage of on-going sessions. Reports can be generated on current sessions and utilized bandwidth as well.

In one or more embodiments, the ability to throttle or terminate sessions is a function of business rules based on session type, client device type, client IP address, content type, and/or content name. Such business rules allow client requests to be denied, throttled, killed, or redirected to other servers. Moreover, embodiments of the disclosure provide the ability to report HTTP usage per client as part of an HTTP session "roll-up," which aggregates all the HTTP requests into a single log entry. Other benefits of embodiments of the disclosure will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A system, comprising:
    an interface portal to receive, at a resource locator pointing to media content, a request for the media content from one client device of a plurality of client devices, the request comprising a secure token;
    a server complex, comprising one or more processors operable with the interface portal, the one or more processors to:
        validate the secure token;
        upon validating the secure token, issue a new token comprising one or more session identification credentials, the one or more session identification credentials comprising:
            a session identifier indicating a session required to retrieve the media content to the client device; and
            an identifier of an edge server, operable with the server complex, to serve the request for the media content; and
        redirect the client device to another resource locator pointing to the media content at the edge server; and
    a resource management system, operable with the server complex and the edge server, the resource management system to one or more of:
        throttle a data rate of the session as a function of the one or more session identification credentials; or
        terminate the session as a function of the one or more session credentials.

2. The system of claim 1, the session comprising a Hypertext Transfer Protocol (HTTP) session, the system comprising a content delivery network system.

3. The system of claim 2, the one or more credentials further comprising:
    an Internet Protocol (IP) address of the client device;
    a client device type;
    a name of the media content; and
    a timestamp indicating when the media content is requested.

4. The system of claim 2, the resource management system further operable to:
    monitor a bandwidth requirement of the session required to retrieve the media content to the client device; and
    where the bandwidth requirement exceeds a predefined bandwidth threshold, throttle the data rate of the session.

5. The system of claim 2, the one or more processors further operable to send a notification to the resource management system indicating that the session will begin.

6. The system of claim 2, the resource management system further operable to receive, from the edge server during the session, one or more of bandwidth usage rates for the session or an amount of bandwidth used in the session.

7. The system of claim 6, the resource management system to throttle the data rate of the session or terminate the session further as a function of the bandwidth usage rates or the amount of bandwidth used.

8. The system of claim 2, the resource management system further operable to receive, from the edge server when the session terminates, a session log file for the session.

9. The system of claim 8, the one or more processors to validate the secure token as a function of one or more prior session log files for the electronic device.

10. The system of claim 8, the session log file comprising:
    a start time for the session;
    an end time for the session; and
    an IP address of the client device.

11. The system of claim 2, the new token further comprising a secret key to be shared by the client device and the edge server during the session.

12. The system of claim 1, the request comprising a HTTP GET request.

13. The system of claim 12, the one or more processors to redirect the client device to the another resource locator with a HTTP redirect message.

14. A method in a content delivery network for controlling Hypertext Transfer Protocol (HTTP) sessions, the method comprising:
    receiving, at an interface portal of a server complex, a request from a client device for media content at a resource locator, the request comprising a secure token;
    validating, with one or more processors of the server complex, the secure token;
    redirecting, with the one or more processors, the client device to another resource locator at an edge server, the redirecting comprising issuing a new token comprising session identification credentials comprising a session identifier identifying a session required to retrieve the media from the another resource locator to the client device and an edge server identifier of the edge server; and
    throttling, with a resource management system operable with the one or more processors, a data rate of the session as a function of the session identification credentials of the new token.

15. The method of claim 14, further comprising monitoring, with the resource management system, one or more of bandwidth usage rates for the session or an amount of bandwidth used in the session, the throttling occurring when the one or more of bandwidth usage rates for the session or the amount of bandwidth used in the session exceeds a predetermined bandwidth threshold.

16. The method of claim 14, further comprising receiving, from the edge server when the session terminates, a session log file for the session.

17. The method of claim 14, further comprising identifying an IP address of the client device from the request, and blocking the request where the IP address matches one or more predefined criteria.

18. A method in a content delivery network for controlling Hypertext Transfer Protocol (HTTP) sessions, the method comprising:
- receiving, at an interface portal of a server complex, a request from a client device for media content at a resource locator, the request comprising a secure token;
- validating, with one or more processors of the server complex, the secure token;
- redirecting, with the one or more processors, the client device to another resource locator at an edge server, the redirecting comprising issuing a new token comprising session identification credentials comprising a session identifier identifying a session required to retrieve the media from the another resource locator to the client device and an edge server identifier of the edge server;
- monitoring, a the resource management system operable with the one or more processors, one or more of bandwidth usage rates for the session or an amount of bandwidth used in the session, and
- terminating the session, with the resource management system, when the one or more of bandwidth usage rates for the session or the amount of bandwidth used in the session exceeds a predefined threshold.

19. The method of claim 18, further comprising identifying an IP address of the client device from the request, and blocking the request where the IP address matches one or more predefined criteria.

20. The method of claim 18, the request comprising a HTTP GET request.

* * * * *